US012672175B2

(12) United States Patent
Lankalapalli et al.

(10) Patent No.: US 12,672,175 B2
(45) Date of Patent: Jun. 30, 2026

(54) METHOD AND SYSTEM OF UNIVERSAL INTEGRATED CIRCUIT CARD (UICC) MANAGEMENT WITHOUT CELLULAR CONNECTIVITY

(71) Applicant: JIO PLATFORMS LIMITED, Ahmedabad (IN)

(72) Inventors: Dhananjaya Lankalapalli, Bangalore (IN); Ganesh Mote, Kalyan (IN); Shyam Sunder Maheshwari, Rajashtan (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 457 days.

(21) Appl. No.: 18/246,289

(22) PCT Filed: Jul. 29, 2022

(86) PCT No.: PCT/IB2022/057061
§ 371 (c)(1),
(2) Date: Mar. 22, 2023

(87) PCT Pub. No.: WO2023/007453
PCT Pub. Date: Feb. 2, 2023

(65) Prior Publication Data
US 2023/0363021 A1 Nov. 9, 2023

(30) Foreign Application Priority Data
Jul. 30, 2021 (IN) .............................. 202121034340

(51) Int. Cl.
*H04W 8/20* (2009.01)
*H04W 8/18* (2009.01)
(Continued)

(52) U.S. Cl.
CPC ............. *H04W 76/10* (2018.02); *H04W 8/18* (2013.01); *H04W 84/12* (2013.01)

(58) Field of Classification Search
CPC ....... H04W 76/10; H04W 8/18; H04W 84/12; H04W 4/50; H04W 4/80; H04W 12/40; H04W 8/205; H04W 4/60; H04M 1/72403
See application file for complete search history.

(56) References Cited

U.S. PATENT DOCUMENTS 8,706,081 B1 * 4/2014 Paya ................... H04M 17/103
455/410
2015/0365781 A1 * 12/2015 Han .......................... G06F 8/65
455/41.2
(Continued)

OTHER PUBLICATIONS

International Search Report from International Appl. No. PCT/IB2022/057061, mailed Nov. 17, 2022.

*Primary Examiner* — Joseph E Dean, Jr.
(74) *Attorney, Agent, or Firm* — FINNEGAN, HENDERSON, FARABOW, GARRETT & DUNNER, LLP

(57) ABSTRACT

The present disclosure provides a method and a system for efficiently managing a Universal Integrated Circuit Card (UICC) associated with a device (104) without cellular connectivity. Particularly, the system and method provide a solution for managing the UICC card through a set of instructions whenever the UICC is not connected to a cellular network, but the device is connected to a Wi-Fi network. Further, the present disclosure enables the user to update the UICC card configuration, issue CAT (Card Application Toolkit) commands to the device, and upgrade the status of carrier-grade applications installed on the device but not limited to the like Thus, the method and the system of the present disclosure can enable to automate the man-
(Continued)

agement of the UICC card, thereby facilitating a faster, consistent, and reliable operation that does not require manual intervention.

10 Claims, 6 Drawing Sheets

(51) Int. Cl.
*H04W 76/10* (2018.01)
*H04W 84/12* (2009.01)

(56) References Cited

U.S. PATENT DOCUMENTS

| | | | |
|---|---|---|---|
| 2016/0112084 A1 | 4/2016 | Parron et al. | |
| 2016/0157092 A1* | 6/2016 | Uy ........................ | H04L 67/025 |
| | | | 455/419 |
| 2017/0164184 A1* | 6/2017 | Borse .................... | H04L 67/306 |
| 2017/0188230 A1* | 6/2017 | Danree ................. | H04L 67/306 |
| 2020/0280847 A1* | 9/2020 | Chien ................... | H04W 12/61 |
| 2020/0288298 A1* | 9/2020 | Li ........................ | H04W 8/183 |

* cited by examiner

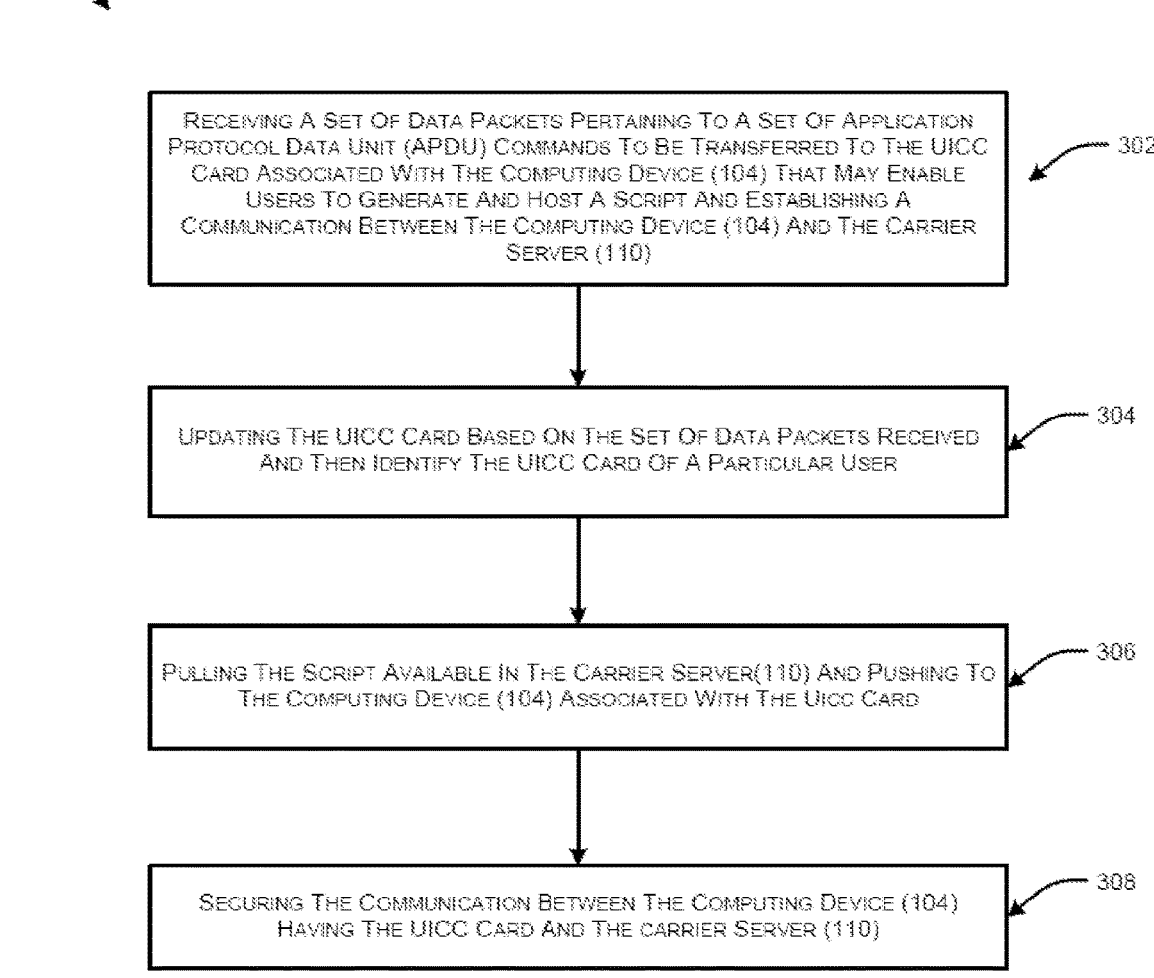

300

RECEIVING A SET OF DATA PACKETS PERTAINING TO A SET OF APPLICATION PROTOCOL DATA UNIT (APDU) COMMANDS TO BE TRANSFERRED TO THE UICC CARD ASSOCIATED WITH THE COMPUTING DEVICE (104) THAT MAY ENABLE USERS TO GENERATE AND HOST A SCRIPT AND ESTABLISHING A COMMUNICATION BETWEEN THE COMPUTING DEVICE (104) AND THE CARRIER SERVER (110) — 302

UPDATING THE UICC CARD BASED ON THE SET OF DATA PACKETS RECEIVED AND THEN IDENTIFY THE UICC CARD OF A PARTICULAR USER — 304

PULLING THE SCRIPT AVAILABLE IN THE CARRIER SERVER(110) AND PUSHING TO THE COMPUTING DEVICE (104) ASSOCIATED WITH THE UICC CARD — 306

SECURING THE COMMUNICATION BETWEEN THE COMPUTING DEVICE (104) HAVING THE UICC CARD AND THE CARRIER SERVER (110) — 308

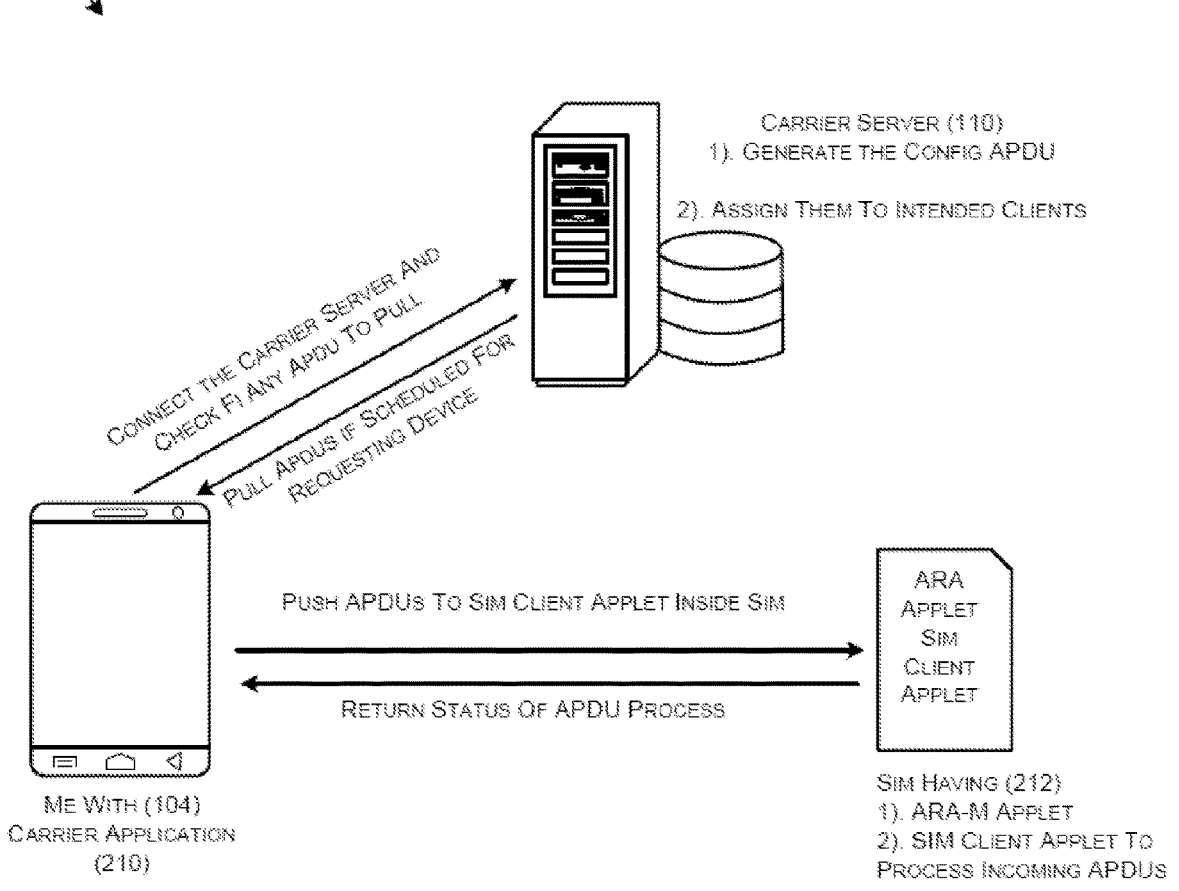

CARRIER SERVER (110)
1). GENERATE THE CONFIG APDU

2). ASSIGN THEM TO INTENDED CLIENTS

CONNECT THE CARRIER SERVER AND
CHECK FI ANY APDU TO PULL

PULL APDUS IF SCHEDULED FOR
REQUESTING DEVICE

PUSH APDUS TO SIM CLIENT APPLET INSIDE SIM

RETURN STATUS OF APDU PROCESS

ARA
APPLET
SIM
CLIENT
APPLET

ME WITH (104)
CARRIER APPLICATION
(210)

SIM HAVING (212)
1). ARA-M APPLET
2). SIM CLIENT APPLET TO
PROCESS INCOMING APDUS

FIG. 4

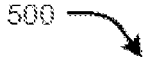
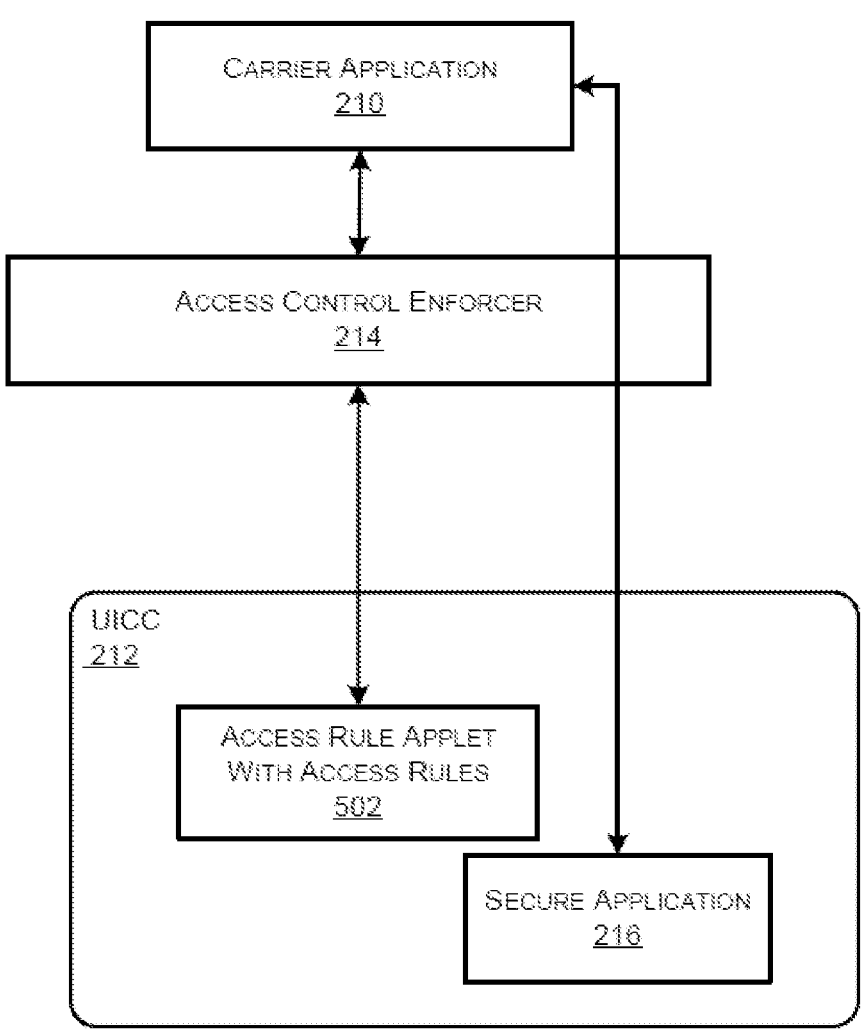
FIG. 5

METHOD AND SYSTEM OF UNIVERSAL INTEGRATED CIRCUIT CARD (UICC) MANAGEMENT WITHOUT CELLULAR CONNECTIVITY

FIELD OF INVENTION

The embodiments of the present disclosure generally relate to the field of communications technologies, and in particular, to a method for implementing a mechanism to manage a Universal Integrated Circuit Card (UICC) associated with a user device without cellular connectivity.

BACKGROUND OF THE INVENTION

The following description of related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of prior art.

Mobile handsets are capable of operating in multiple modes of operation. The handset may operate within, for example, a Long-Term Evolution (LTE) network environment or within a network communication environment such as a Code Division Multiple Access (CDMA) network. Existing topologies involving phones capable of operating in an LTE network and a CDMA network have issues. Unscrupulous individuals may misuse these issues caused by the interactions between mobile equipment communicating over the LTE and CDMA networks and a UICC that enables communication through the mobile equipment.

The UICC, also known as a SIM card, is a smart card (integrated circuit card) used in mobile terminals in GSM and UMTS networks. The UICC ensures the integrity and security of all kinds of personal data, and it typically holds a few hundred kilobytes. The UICC card is generally a chip inside a mobile terminal. The UICC card is used to store the content of the mobile terminal, such as subscriber information, a cipher key, and a user phonebook. The UICC card is provided for a Global System for Mobile Communication (GSM), LTE (4G) and 5G network to authenticate an identity of a subscriber and encrypt voice information during a call of the subscriber, and the like.

When a user carrying a mobile terminal, roams between different regions, the user usually chooses to use a Subscriber Identity Module (SIM) or UICC card registered in a roamed-to region to reduce roaming charges. The SIM card is a chip provided with a hardware structure. When the SIM card is replaced, the user needs to insert another SIM card into a reserved position of the terminal. When roaming between different regions, the user needs to replace the SIM card frequently, which causes inconvenience of use and affects user experience.

Hence, today if there is no cellular connectivity, it is not possible to reach the UICC card. Problems arise when a subscriber fails to latch to a cellular network due to corruption in UICC file content. The subscriber may also fail to latch to the cellular network if he/she is outside his/her home country without an International Roaming (IR) plan. The subscriber may be in an international network and the subscriber's UICC card may not have an updated configuration that is essential to latch with the international network. In such scenarios, there is no way to manage the UICC card.

Further, there may be a need to do a RAM (Remote Application Management) operation such as an Operating System (OS) patch to fix issues on the UICC card. There may also be a need to push an application on the UICC card to enable certain features. As of today, RAM operations are possible only if the device has cellular connectivity. However, the solution provided by the present disclosure may be used to perform RAM operations on the UICC card without cellular connectivity by connecting the device to a Wi-Fi network.

There is therefore a need in the art to provide a method and a system for implementing a mechanism to manage the UICC card without cellular connectivity.

OBJECTS OF THE PRESENT DISCLOSURE

Some of the objects of the present disclosure, which at least one embodiment herein satisfy are as listed herein below.

It is an object of the present disclosure to manage the UICC card even if a subscriber device or terminal does not have cellular connectivity.

It is an object of the present disclosure to enable the use of a carrier application to manage the UICC card which pulls APDU (Script) from a server on Wi-Fi.

It is an object of the present disclosure to enable management of the UICC card even if the subscriber is outside his home country and wants to buy a roaming plan from his home operator.

It is an object of the present disclosure to enable management of the UICC card even if its configuration is corrupted (wrong configuration).

It is an object of the present disclosure to do RAM (Remote Application Management) and RFM (Remote File Management) operation on the UICC card over Wi-Fi even if the device does not have cellular connectivity.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for managing a Universal Integrated Circuit Card (UICC) of a user device without cellular connectivity. The system pulls a set of data packets from a carrier server. The set of data packets corresponds to Application Protocol Data Unit (APDU) commands. The set of data packets are generated and hosted in a server application (208) of the carrier server. Further, the system transmits the pulled set of data packets to the UICC card of the user device connected to a Wi-Fi network. The system connects to the carrier server by passing an Integrated Circuit Card ID (ICCID) to the carrier server. Further, the system updates a configuration of the UICC card of the user device based on the pulled set of data packets. The UICC card stores information that comprises subscriber information, a cipher key, and a user phonebook information associated with a user device. Furthermore, the system establishes a communication between the user device associated with the UICC card and the carrier server based on the transmitted set of data packets. The communication between the user device associated with the UICC card and the carrier server is a (Transport Layer Security) TLS handshake for secure connection. The UICC card and the carrier server comprises RFM (Remote File Update) or RAM (Remote Application Management) or SIM/USIM Toolkit Commands actions in a user device associated with the UICC Card and issuing of CAT commands to a user device associated with the UICC Card.

In an aspect, the present disclosure provides a method for managing a Universal Integrated Circuit Card (UICC) of a user device without cellular connectivity. The method includes pulling, by a processor, the generated set of data packets from a carrier server. The set of data packets corresponds to Application Protocol Data Unit (APDU) commands. Further, the method includes transmitting, by the processor, the pulled set of data packets to the UICC card of the user device connected to a Wi-Fi network. The set of data packets are generated and hosted in a server application of the carrier server. Further, the method includes connecting to the carrier server by passing an Integrated Circuit Card ID (ICCID) to the carrier server. Further, the method includes updating, by the processor, a configuration of the UICC card of the user device based on the pulled set of data packets. The UICC card stores information that comprises subscriber information, a cipher key, and a user phonebook information associated with a user device. Furthermore, the method includes establishing, by the processor, a communication between the user device associated with the UICC card and the carrier server based on the transmitted set of data packets. the communication between the user device associated with the UICC card and the carrier server is a (Transport Layer Security) TLS handshake for secure connection. The communication between the user device associated with the UICC card and the carrier server comprises RFM (Remote File Update) or RAM (Remote Application Management) actions in a user device associated with the UICC Card and issuing of CAT commands to a user device associated with the UICC Card.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 3 illustrates an exemplary method flow diagram (300) depicting a method for management of a UICC card without cellular connectivity, in accordance with an embodiment of the present disclosure.

FIG. 4 illustrates an exemplary representation (400) of a communication flow diagram, in accordance with an embodiment of the present disclosure.

FIG. 5 illustrates an exemplary representation (500) of an overview of the workability of the system (108) and method, in accordance with an embodiment of the present disclosure.

Figure 1:
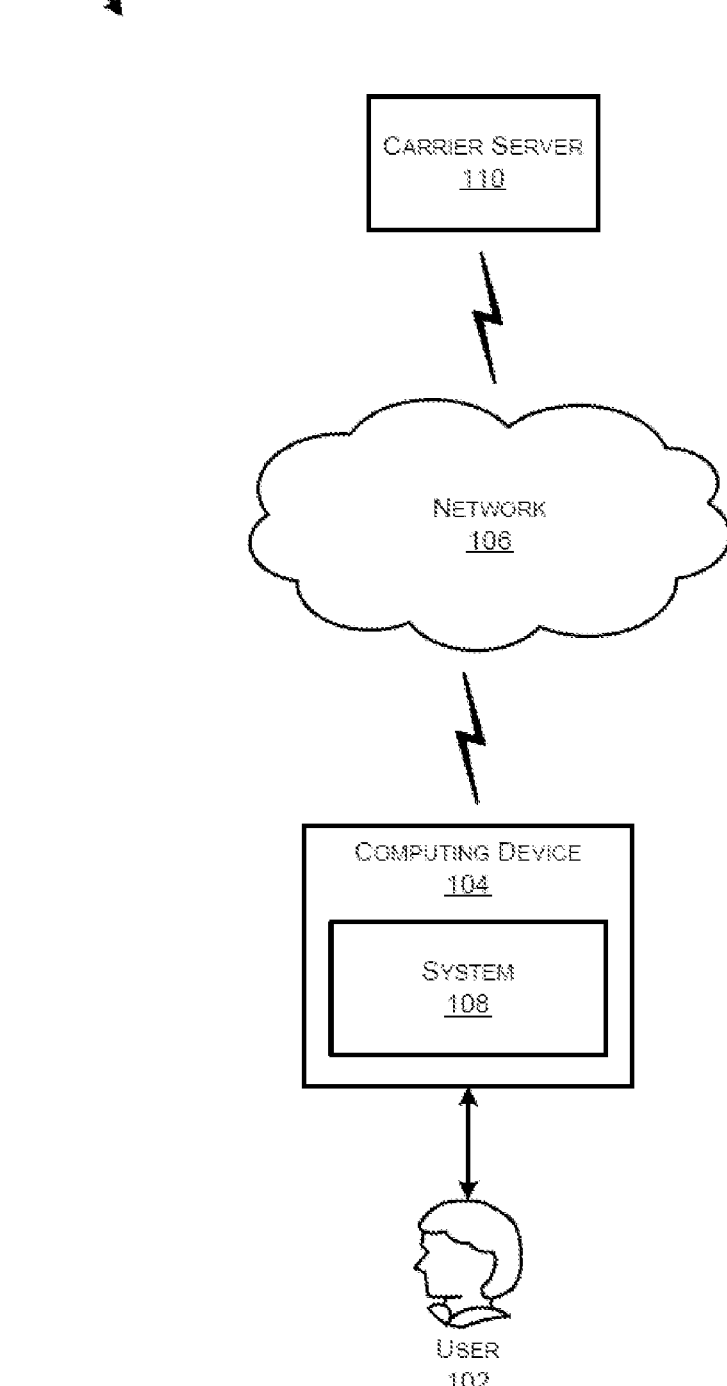
FIG. 1 illustrates an exemplary network architecture (100) in which or with which proposed system (108) of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a solution to the above-mentioned problems by providing a method and a system for efficiently managing the UICC card without cellular connectivity. Particularly, the system and method provide a solution for managing the UICC card (in a mobile device or terminal) by a set of instructions whenever the UICC card is not connected to a cellular network, but the mobile device or terminal is connected to a Wi-Fi network. Thus, the method and the system of the present disclosure can automate the management of the UICC card, thereby facilitating a faster, consistent, and reliable operation that does not require manual intervention and hence is devoid of the disadvantages associated thereto.

Referring to FIG. 1 which illustrates an exemplary network architecture (100) in which or with which the system (108) of the present disclosure can be implemented, in accordance with an embodiment of the present disclosure. As illustrated, the exemplary architecture (100) includes the system (108) for providing a mechanism to manage a UICC card without cellular connectivity. The system (108) is a part of a user computing device (104). A plurality of users (102-1, 102-2, . . . 102-n) (hereinafter interchangeably referred to as subscribers and collectively referred to as 102) is also shown in the figure. Each user (102) may be associated with at least one computing device (104-1, 104-2, . . . 104-n) (hereinafter interchangeably referred to as a smart computing device or user device or subscriber device and mobile terminal; and collectively referred to as 104). A UICC card may be associated with the computing device (104). The users (102) may interact with the system (108) by using their respective computing devices (104). The computing device (104) and the system (108) may communicate with each other over a network (106). The system (108) may be associated with a carrier server (110).

The system (108) may be configured to receive a set of data packets pertaining to a set of Application Protocol Data Unit (APDU) commands to be transferred to the UICC card associated with the computing device (104). In an embodiment, the carrier server (110) generates and hosts the set of APDU commands. The system pulls the set of APDU commands from the carrier server (110) and pushes the set of APDU commands to the computing device (104) associated with the UICC card.

In an embodiment, the system (108) may be configured to obtain a registration data based on a request from an unregistered user through the computing device (108). In an exemplary embodiment, the UICC card credentials of the user (102) may be generated based on an acknowledgment of the request and verification of the registration data. In another exemplary embodiment, the user (102) may enter the generated UICC card credentials to access the system (108) to obtain the information service associated with a UICC card application.

In an exemplary embodiment, only an authorized user can gain access to the system (108).

In an embodiment, the plurality of users (102) can access the UICC card using their respective computing devices via a set of instructions residing on any operating system, including but not limited to, Android™, iOS™, and the like. In an embodiment, the computing device (104) may include, but not limited to, any electrical, electronic, electro-mechanical or any equipment or a combination of one or more of the above devices such as mobile phone, smartphone, virtual reality (VR) devices, augmented reality (AR) devices, pager, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, a touch-enabled screen, electronic pen and the like. It may be appreciated that the computing device (104) may not be restricted to the mentioned devices and various other devices may be used. A smart computing device may be one of the appropriate systems for storing data and other private/sensitive information.

In an exemplary embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may include, by way of example but not limitation, one or more of a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber-optic network, some combination thereof.

In another exemplary embodiment, the carrier server (110) may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the system (108) for managing the UICC card may include one or more processors coupled with a memory. The memory may store instructions which when executed by the one or more processors may cause the system (108) to perform steps as described hereinabove.

Figure 2:
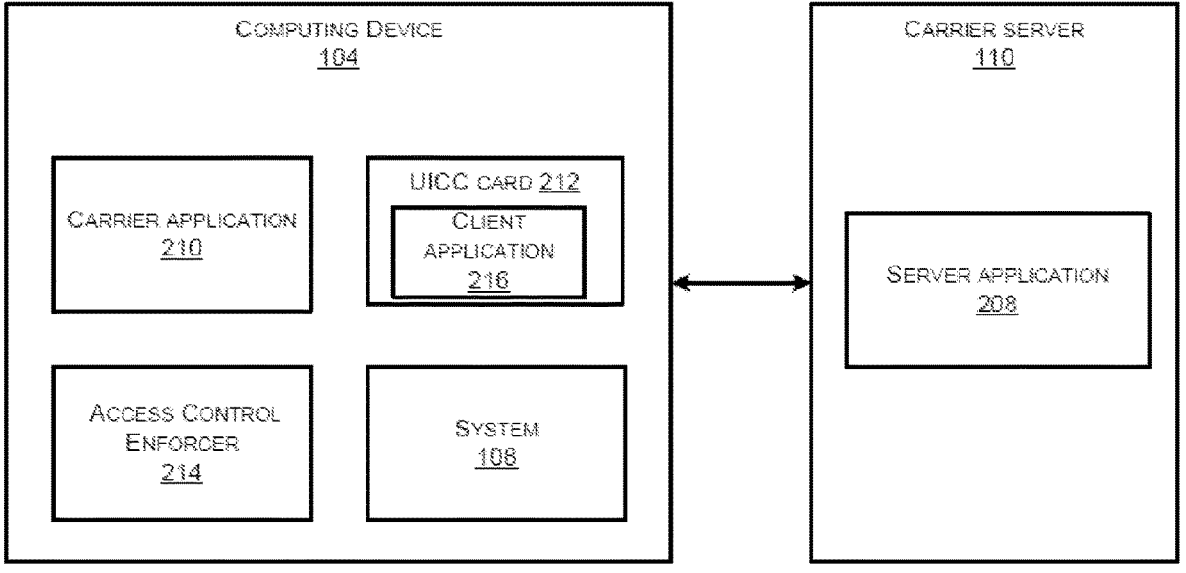
FIG. 2 illustrates an exemplary representation (200) of the system (108), in accordance with an embodiment of the present disclosure.

FIG. 2, with reference to FIG. 1, illustrates an exemplary representation of the system (108), in accordance with an embodiment of the present disclosure. In an aspect, the system (108) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (108). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (108) may include an interface(s) (206). The interface(s) (206) may comprise a variety of interfaces, for example, interfaces for data input and output devices, referred to as I/O devices, storage devices, and the like. The interface(s) (206) may facilitate communication of the system (108). The interface(s) (206) may also provide a communication pathway for one or more components of the carrier server (110).

The processing engine(s)(208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (108) may comprise the machine-readable storage medium storing the instructions and the processing resource to execute the instructions, or the machine-readable storage medium may be separate but accessible to the system (108) and the processing resource. In other examples, the processing engine(s) (208) may be implemented by electronic circuitry.

As illustrated in FIG. 2, the system may be a part of the computing device (104). The computing device (104) may be communicatively coupled to the carrier server (110) that may have a server application (208). The server application (208) may be responsible for generation and hosting of scripts that may be a set of APDU commands. The scripts generated by the server application (208) may be transmitted to the UICC card (212). The system (108) may be located in the computing device (104) along with a carrier application (210), a UICC card (212), and an Access Control Enforcer (214). The UICC card (212) may house a client application (216). The carrier application (210) may connect to the carrier server (110) to check for scripts, if any available, in the UICC card (212). The carrier application (210) may pass an Integrated Circuit Card ID (ICCID) of the UICC card (212) to the carrier server (110) to enable the carrier server (110) to identify a client of the UICC card. The Access Control Enforcer (214) may provide secure support to the computing device (104) and the client application (216) on the UICC card.

FIG. 3 is a flow diagram (300) illustrating a process for management of the UICC card without cellular connectivity, in accordance with an embodiment of the present disclosure. At step 302, the method may include the step of generating and hosting a set of data packets by the carrier server (110). The data packets may pertain to a set of application protocol data unit (APDU) commands to be transferred to the UICC card associated with the computing device (104). The APDU commands may enable the users (102) to establish a communication between the computing device (104) and the carrier server (110). At step 304, the method may include the step of updating the UICC card based on the set of data packets received and then identifying the UICC card of a particular user (102). At step 306, the method may include the step of pulling the script available and pushing it to the computing device (104) associated with the UICC card. The method may further include at 308, the step of securing the communication between the computing device (104) having the UICC card and the carrier server (110).

The system and method of the present disclosure may be further described in view of exemplary embodiments. FIG. 4 illustrates an exemplary representation (400) of a communication flow diagram taking place in the system (108), in accordance with an embodiment of the present disclosure.

As illustrated in the figure, a set of APDU commands may be generated in the carrier server (110) that may have the server application (208). The server application (208) may generate the APDU commands in the form of scripts and may deliver the scripts to the UICC card (212) that may have the client application (214). The client application (214) inside the UICC card (212) may process the scripts to establish a communication between the computing device (104) associated with the UICC card (212) and the carrier server (110) for performing Remote File Update (RFM) actions and issuing CAT commands. The carrier application (210) in the computing device (104) may connect to the carrier server (110) to check for available scripts by passing the ICCID to the carrier server (110). The server application receives the ICCID of the UICC card (212) and uses the ICCID to identify a client name associated with the UICC card.

If the script is available on the carrier server (110) for the UICC card, then the Carrier Application (210) may pull the script and push to the client application (216) on the UICC card (212). Communication between the carrier server (110) and the carrier application (210) shall perform a (Transport Layer Security) TLS handshake to have a secure connection. The communication between the carrier application (210) and the client application (216) on the UICC card (212) may be secured by Global Platform Secure Element Access Control (GP SEAC) V1.1 specification (ARA Application) but not limited to it.

FIG. 5 illustrates a block diagrammatic representation (500) of the workability of the system (108) and the method, in accordance with an embodiment of the present disclosure. In an exemplary embodiment, the carrier application (210) signed with a unique key may try to access the UICC card application (216) through its AID (Application ID) on a Secure Element. The Access Control Enforcer (214) may read an Access Rule for the specific AID and Grant access to the UICC card application (216) according to the access rule or deny access if no rule is found. The carrier application (210) can communicate with the UICC card application (216) if the command APDUs match the filter list (if given) checked by the Access Control Enforcer (214).

The Access Control Enforcer (214) may read an access rule from an ARA-M according to the applications certificate and AID of the apples to be accessed when a communication channel is opened. Access may either be granted according to access rule or denied if no rule is found. When the communication channel is established all APDU transfers may be checked against the APDU filter list if available. No access policy may be stored in the ACE itself and all data may be read from the Secure Element, the ARA-M.

The ARA (Access Rule Application) (502) on the secure element may store the Access Rules. The ARA may consist of at least a unique ARA-M (Access Rule Application Master). All Access Rules may be stored in the ARA and may be accessed by the Access Control Enforcer (214) via the ARA-M.

In an exemplary embodiment, an algorithm for Applying Rules and Access Rule may include the Access Rule (AR) being stored in the ARA and can be updated over the air with standardized Global Platform Secure Messaging or Remote Applet Management functionality. The AR may consist of a set of data objects (DO). The AR may be identified by the AID of the applet to be accessed (AID-REF-DO) and the hash (SHA-1) of the applications certificate (Hash-REF-DO). The Access Rule DO may contain an APDU access rule (APDU-AR-DO) and/or a NFC (Near Field Communication) access rule (NFC-AR-DO). The APDU-AR-DO may contain either a general flag (allowed/not allowed) or an APDU filter list. An APDU filter may consist of a 4-byte APDU header and a 4-byte APDU filter mask. In an embodiment, the format of rule may be as shown below:

REF-AR-DO=REF-DO|AR-DO $E2=E1|E3$

REF-DO=AID-REF-DO|DeviceAppID-REF-DO $E1=4F|C1$

AR-DO=APDU-AR-DO|NFC-AR-DO $E3=D0|D1$

In an exemplary embodiment, a sample rule may include but not limited to storing rules in ARA-M (Allow ALL APK to Access ALL AIDs) 80 E2 90 00 12 F010 E20E E104 4F00 C100 E306 D00101 D10101 (9000).

If the device doesnot support the ARA Application then the present disclosure may allow the user to use the ARF (Access Rule File) to store the rules.

If the ARF is also not supported then communication between the device application and the secure element that is the SIM Card can be done by an AT command or a Carrier Preveledge or other available method.

For end-to-end security; there could be TLS security between the device application and the carrier server and one more layer of security between the carrier server and the SIM card by putting secure keys inside the sim card and the carrier server.

Figure 6:
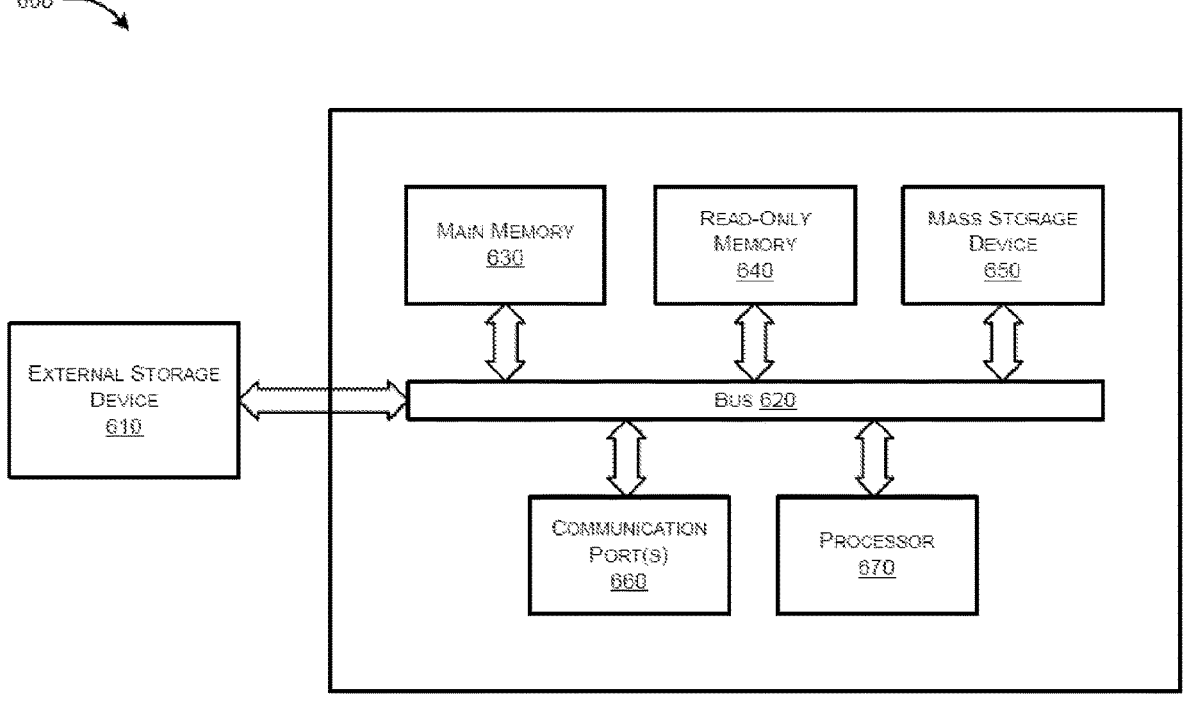
FIG. 6 refers to an exemplary computer system (600) in which or with which embodiments of the present invention can be utilized, in accordance with embodiments of the present disclosure.

FIG. 6 illustrates an exemplary computer system (600) in which or with which embodiments of the present invention can be utilized in accordance with embodiments of the present disclosure. As shown in FIG. 6, the computer system (600) can include an external storage device (610), a bus (620), a main memory (630), a read-only memory (640), a mass storage device (650), a communication port (660), and a processor (670). A person skilled in the art will appreciate that the computer system may include more than one processor and communication ports. Examples of the processor (670) include, but are not limited to, an Intel® Itanium® or Itanium 2 processor(s), or AMD® Opteron® or Athlon MP® processor(s), Motorola® lines of processors, Forti-SOC™ system on chip processors, or other future processors. The processor (670) may include various modules associated with embodiments of the present disclosure. The communication port (660) can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which the computer system (600) connects. The memory (630) can be Random Access Memory (RAM), or any other dynamic storage device commonly known in the art. The Read-only memory (640) can be any static storage device(s) e.g., but not limited to, a Programmable Read Only Memory (PROM) chips for storing static information e.g., start-up or BIOS instructions for the processor (670). The mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar7K1000), one or more optical discs, Redundant Array of Independent Disks (RAID) storage, e.g. an array of disks (e.g., SATA arrays), available from various vendors.

The Bus (620) communicatively couples the processor(s) (670) with the other memory, storage and communication blocks. The bus (620) can be, e.g. a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects the processor (670) to the computer system.

Optionally, operator and administrative interfaces, e.g. a display, keyboard, and a cursor control device, may also be coupled to the bus (620) to support direct operator interaction with a computer system. Other operator and administrative interfaces can be provided through network connections connected through the communication port (660). The external storage device (610) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for efficiently managing a UICC Card without cellular connectivity through a first set of instructions residing in a server and connected to a network. The proposed solution can be used to update card configuration, issue CAT (Card Application Toolkit) command to the device, and upgrade a status of carrier-grade applications installed on the device but not limited to the like.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Key Advantages

The present disclosure provides efficient and reliable systems and methods for automatically managing the UICC card associated with a device without cellular connectivity when the device is connected to Wi-Fi.

The present disclosure provides systems and methods for updating the configuration of the UICC card associated with a device without cellular connectivity, issuing CAT (Card Application Toolkit) commands to the device, and upgrading the status of carrier-grade applications installed on the device but not limited to the like.

Another advantage of the present disclosure is that it provides a solution for managing the UICC card associated with a device without cellular connectivity in an international network. The present disclosure enables a user to update the configuration of the UICC card that is essential for latching on to the international network outside the home country.

Reservation of Rights

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in Global Platform Specs for ARA: GPD_SE_Access_Control_v1.1 ETSI Specs for AT Command: 127 007 And Javacard Framework Architecture, and the like.

We claim:

1. A system for managing a Universal Integrated Circuit Card (UICC) of a user device without cellular connectivity, the system comprising: a processor; and a memory coupled to the processor, wherein the memory comprises processor-executable instructions, which on execution, cause the processor to: pull a set of data packets from a carrier server, wherein the set of data packets comprise scripts including Application Protocol Data Unit (APDU) commands that are generated by a server application of the carrier server and hosted in the server application as scripts for execution by a client application on the UICC; transmit the pulled set of data packets to the UICC of the user device connected to a Wi-Fi network; update a configuration of the UICC of the user device based on the pulled set of data packets; and establish a communication between the user device associated with the UICC and the carrier server based on the transmitted set of data packets, wherein the communication between the user device and the carrier server includes a secure element access control mechanism that restricts access to the UICC to authorized applications only.

2. The system as claimed in claim 1, wherein the processor-executable instructions, on execution, cause the processor to connect to the carrier server by passing an Integrated Circuit Card ID (ICCID) to the carrier server.

3. The system as claimed in claim 1, wherein the UICC stores information that comprises subscriber information, a cipher key, and user phonebook information associated with the user device.

4. The system as claimed in claim 1, wherein the communication between the user device associated with the UICC and the carrier server is a Transport Layer Security (TLS) handshake for secure connection.

5. The system as claimed in claim 1, wherein the communication between the user device associated with the UICC card and the carrier server comprises Remote File Management (RFM) actions in the user device associated with the UICC and issuing of CAT commands to the user device associated with the UICC.

6. A method for managing a Universal Integrated Circuit Card (UICC) of a user device without cellular connectivity, the system comprising: pulling, by a processor, a set of data packets from a carrier server, wherein the set of data packets comprise scripts including Application Protocol Data Unit (APDU) commands that are generated by a server application of the carrier server and hosted in the server application as scripts for execution by a client application on the UICC; transmitting, by the processor, the pulled set of data packets to the UICC of the user device connected to a Wi-Fi network; updating, by the processor, a configuration of the UICC of the user device based on the pulled set of data packets; and establishing, by the processor, a communication between the user device associated with the UICC and the carrier server based on the transmitted set of data packets, wherein the communication between the user device and the carrier server includes a secure element access control mechanism that restricts access to the UICC to authorized applications only.

7. The method as claimed in claim 6, wherein the processor connects to the carrier server by passing an Integrated Circuit Card ID (ICCID) to the carrier server.

8. The method as claimed in claim 6, wherein the UICC stores information that comprises subscriber information, a cipher key, and user phonebook information associated with the user device.

9. The method as claimed in claim 6, wherein the communication between the user device associated with the UICC card and the carrier server is a Transport Layer Security (TLS) handshake for secure connection.

10. The method as claimed in claim 6, wherein the communication between the user device associated with the UICC and the carrier server comprises Remote File Management (RFM) actions in the user device associated with the UICC and issuing of CAT commands to the user device associated with the UICC.

* * * * *